No. 651,476. Patented June 12, 1900.
O. T. BUGG, Jr.
SECONDARY OR STORAGE BATTERY.
(Application filed July 11, 1899.)
(No Model.)
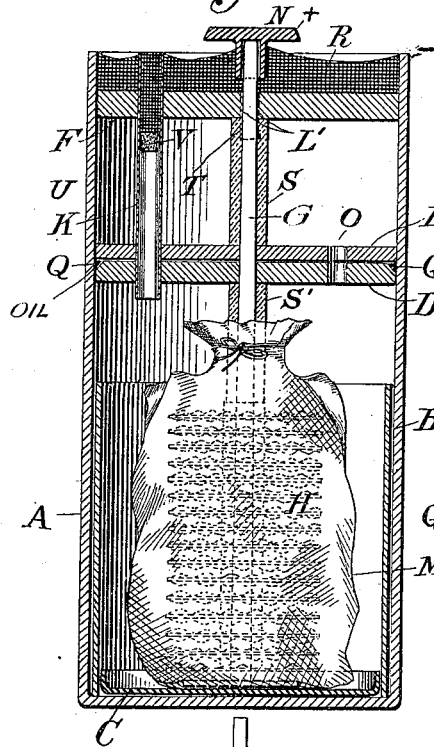
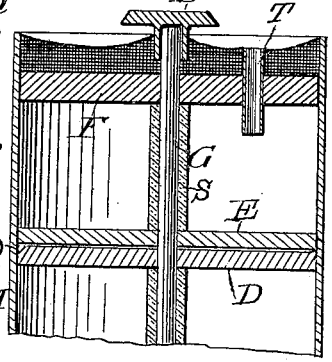
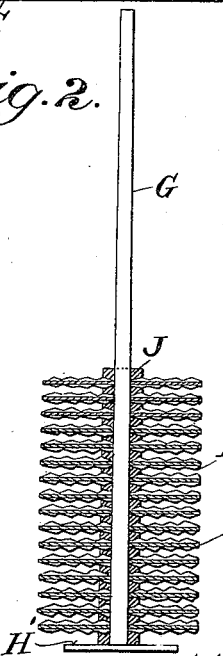
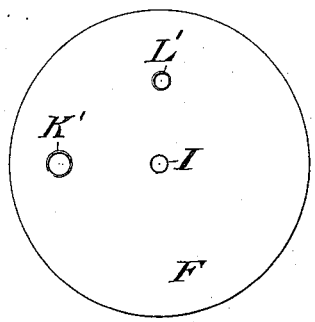
Witnesses
Edward G. Rowland
M. F. Keating
Inventor
Owen T. Bugg Jr
By his Attorney
Charles J. Kintner

UNITED STATES PATENT OFFICE.

OWEN T. BUGG, JR., OF NEW YORK, N. Y., ASSIGNOR TO THE UNITED STATES BATTERY COMPANY, OF SAME PLACE.

SECONDARY OR STORAGE BATTERY.

SPECIFICATION forming part of Letters Patent No. 651,476, dated June 12, 1900.

Application filed July 11, 1899. Serial No. 723,459. (No model.)

*To all whom it may concern:*

Be it known that I, OWEN T. BUGG, Jr., a citizen of the United States, residing at New York, in the borough of Brooklyn, in the county of Kings and State of New York, have made a new and useful Invention in Secondary or Storage Batteries, of which the following is a specification.

My invention has for its objects, first, to so construct a secondary or storage battery that it will be, in effect, sealed, so that the liquid therein will not escape and at the same time will permit of the free escape of all gases generated therein; second, to provide a storage battery in which the containing vessel constitutes one electrode with a medium in the nature of a heavy oil which prevents local action between the containing vessel and the contained electrode and electrolyte; third, to so construct the negative or charged electrode for batteries of the character indicated that it presents a maximum surface and that the parts thereof may be readily assembled in the construction thereof, and, fourth, to provide means for preventing the disintegrated parts or pieces of the negative or charged electrode from coming into contact with the electrode of opposite polarity.

To these ends my invention consists in the novel features illustrated in the accompanying drawings, disclosed in the following specification, and particularly pointed out in the claims at the end of this specification.

I have illustrated the essential feature of my invention as applicable to secondary or storage batteries of the lead-zinc type.

Referring now to the drawings, Figure 1 represents a vertical sectional view of my novel battery. Fig. 2 is a part-sectional part side elevational view of the negative or charged electrode and its sustaining standard or stem. Fig. 3 is a plan view of one of the parts which when assembled constitute the negative or charged electrode, and Fig. 4 is a transverse sectional view thereof. Fig. 5 is a top plan view of the upper portion of the means for sealing or inclosing the battery so that it will permit the gas to escape and will also act as a means for preventing the liquid from escaping when the cell is turned on its side or bottom up. Fig. 6 is a vertical sectional view of the upper portion of the cell, taken on a plane at right angles to that upon which Fig. 1 is taken, showing more clearly the arrangement of the vent-tubes.

Referring now to the drawings in detail, in all of which like letters of reference represent like parts wherever used, and first to Fig. 1, A represents a metallic or conducting containing vessel made, preferably, of copper and constituting one pole of the battery, my novel form of battery being of that type in which when two cells are connected in series one is placed upon top of the other.

B is a sheet of zinc which is first rolled into cylindrical form and then thoroughly amalgamated and slipped into position within the vessel A.

C is an insulating-cup made of paper and then paraffined, or it may be made of glass, hard rubber, or of such material as will withstand the action of storage-battery liquids.

H represents the negative or charged electrode, consisting, preferably, of circular lead plates P, which are indented, as shown, on both sides, said plates having a central opening, as illustrated in Fig. 3, adapting them to be strung upon a standard or stem G, made, preferably, of lead and having at its lower end a sustaining-head H'. These plates P are separated from each other by lead spacing-washers J, which are slipped into position alternately with said plates, fitting snugly about the standard or stem G, so that when all of the parts are assembled they constitute, with the standard or stem, a compact rigid electrode having a large active surface.

M represents a bag made, preferably, of woolen or other porous material and designed to be tied or secured at its upper end about the negative electrode H, its function being to prevent disintegrated particles of the electrode from coming into contact with the zinc B, the cup C acting also as an additional means for preventing any particles from effecting such contact in the event of their escaping through the bag M.

F represents a sealing-partition adapted to seal the upper end of the vessel A and having three openings I, K', and L', the central opening I being adapted to fit snugly about the upper end of the standard or stem G. D and E represent additional partitions adapted to be situated intermediate the partition F and the electrode H, as clearly illustrated in Fig. 1. The partition D is beveled at its outer edge, as shown, for the purpose of receiving when in position a sealing medium Q in the nature of a heavy oil, preferably of what is known by machinists as "cylinder-oil." The partitions D, E, and F when in position in the cell are so located that the two larger openings K' in each of said partitions are in alinement with each other for the purpose of receiving a filling-tube K. The partitions D and E are provided with additional smaller openings O, located in alinement with each other, while the partition F is provided with a similar small opening L' (see Fig. 5) ninety degrees distant from the openings O and K', the arrangement being such that when the parts are assembled these openings will not offer a direct passage to the liquid should the vessel be turned upon its side.

S and S' represent tubes, preferably of glass, for spacing or separating and sustaining the partitions in position.

V represents a cork for sealing the filling-tube K.

N represents a metallic contact-button provided with a downwardly-extending sleeve adapted to fit snugly about the upper end of the standard or stem G.

R represents the sealing medium, consisting of any well-known battery-cement, such as sealing-wax or the like.

The several parts of the battery are assembled as follows: The sheet of zinc B is rolled into cylindrical form and thoroughly amalgamated with mercury in the usual way, after which it is slipped into the position shown. The cup C is then slipped into place, after which the electrode H, assembled in the manner hereinbefore described, is subjected to the charging action of the electrical source of energy and the glass sleeve S' slipped into place over the free end of the standard or stem G. The electrode is then slipped into the bag M and the upper end thereof securely tied in the manner shown. It is then put into position within the cell and the partition D forced into place about the standard or stem G until it rests firmly upon the glass sleeve S'. The groove formed by the beveled upper edge of the partition D is then filled with a heavy oil, preferably what is known as "cylinder-oil," after which the partition E is slipped into position with the small hole O in alinement with the corresponding small hole of the partition D, the large holes of said partitions being also in alinement with each other. The inner surface of the cell above the partition D is also carefully coated with this heavy oil, its function being to prevent any local action between the vessel A and the contained electrode H. The second glass sleeve S is now slipped into place about the standard or stem G and the last partition F forced into its position, with the small vent-hole L' located at ninety degrees distance from the vent-holes O of the partitions D and E, as shown in dotted lines in Fig. 1. The filling-tube K and vent-tube T are now put in position and the contact-button N secured to the top of the standard G, after which the upper portion of the containing vessel A is filled with the insulating medium R, of battery-cement, it being of course obvious that the upper ends of the tube K and a corresponding small vent-tube T in the opening L' will prevent such material from passing through the upper partition F and will thus effectually seal the entire cell. The small vent-tube T in the opening L' should extend also a slight distance below the lower surface of the partition F, as shown in dotted lines in Fig. 1. The cell is now ready for transportation, and the excitant liquid, preferably diluted sulfuric acid or such materials as are usually used in connection with lead-zinc batteries, may be poured into the electrode-chamber through the filling-tube K, after which the cork V is slipped into position and the upper end of the tube K thoroughly sealed with sealing-wax or other preferred material. The cell is now ready for use.

It is obvious that any gases generated in the electrode-chamber beneath the partition D will escape by or through the vent-holes O and the corresponding vent-hole L' in the upper partition F. It is also apparent that by reason of the angular location of the vent-holes in the two sets of partitions no liquid will escape to the outside when the cell is on its side or turned upside down and that such liquid as does escape into the upper chamber will quickly return to the electrode-chamber when the vessel is righted.

Should the cell be turned upside down, it is obvious that only a small quantity of liquid can escape into the vent-chamber between the partitions E and F, as it is a well-known fact that air cannot enter through such an opening without sufficient vent. It is also apparent that even such liquid as does escape into the vent-chamber between the partitions cannot escape from the cell, owing to the downward extension of the vent-tube T in the outer partition F, as illustrated in dotted lines in Fig. 1.

I have discovered that the material Q, of any heavy oil which will not solidify at atmospheric temperatures, such as cylinder-oil, has an especial utility in serving as an insulator for a secondary or storage battery and that it effectually insulates a battery in such manner that there is no possibility of short circuit between the electrodes through the sealed portion thereof, a defect which I have had great difficulty in overcoming, as paraffin, pitch, and other well-known materials which have heretofore been utilized for this purpose do not fully accomplish the result sought, because they harden at atmospheric temperatures and permit the usual creeping action to take place, so that I claim an especial novelty and utility in the use of a heavy oil, such as cylinder-oil, for this purpose.

Having thus described my invention, what I claim, and desire to secure by Letters Patent of the United States, is—

1. A secondary or storage battery cell provided with sealing-partitions F and D located in its upper end and having each a vent-opening, the partition D being beveled at its outer edge so as to provide a groove between it and the vessel A, said groove being filled with a heavy oil for the purpose of preventing local action, substantially as described.

2. A secondary or storage battery cell consisting of a conducting containing vessel constituting one pole thereof, together with a positive electrode contained therein; in combination with a negative electrode within the cell, two or more sealing-partitions located in the upper end of the cell and each provided with a vent-opening, said vent-openings being located out of alinement with each other and one of said partitions being provided with a groove at its outer edge filled with a heavy oil for the purpose of preventing local action, substantially as described.

3. A secondary or storage battery cell consisting of a conducting containing vessel constituting one pole thereof, together with a positive electrode contained therein; in combination with a negative electrode located within the cell, two or more sealing-partitions located in the upper end of the cell and each provided with a vent-opening, the lower partition being provided with a groove on its outer edge and a filling of a heavy oil; together with an amalgamated sheet of zinc located within and in electrical contact with the inner wall of the cell, substantially as described.

4. A secondary or storage battery cell consisting of a conducting containing vessel constituting one pole thereof, together with a positive electrode contained therein; a second electrode located therein, two or more sealing-partitions located in the upper end of the cell and separated by definite spaces so as to divide the cell into two or more chambers, each of said sealing-partitions being provided with an escape or vent opening, and the lower one with a groove about its upper outer edge and a filling of a heavy oil; in combination with a filling-tube extending through said partitions and means for filling said sealing-tube, substantially as described.

5. A secondary or storage battery cell consisting of a conducting containing vessel constituting one pole thereof, together with a positive electrode contained therein; in combination with a negative electrode and one or more sealing-partitions located in the upper end of the cell and adapted to hold the negative electrode in place; together with a sealing medium and vent-openings in the partitions for permitting of the free escape of gas, substantially as described.

6. A secondary or storage battery cell consisting of a conducting containing vessel constituting one pole thereof, together with a positive electrode contained therein; a negative electrode and two or more sealing-partitions located in the upper end of the cell and having vent-openings, said partitions constituting the means for holding or securing the negative electrode in place; in combination with a porous bag which surrounds the negative electrode and an insulating-cup located beneath the porous bag and resting upon the bottom of the conducting containing vessel, substantially as described.

7. A secondary or storage battery cell consisting of a conducting containing vessel, constituting one pole thereof, together with a positive electrode contained therein; a negative electrode composed of a conducting-standard and a series of perforated lead or analogous plates separated from each other by conducting-washers and sustained by said standard; together with two or more sealing-partitions located in the upper end of the cell and having vent-openings, a porous bag surrounding the negative electrode and an insulating-cup located beneath the same, all of said parts acting substantially as and for the purpose described.

In testimony whereof I have hereunto subscribed my name this 6th day of June, 1899.

OWEN T. BUGG, JR.

Witnesses:
C. J. KINTNER,
M. F. KEATING.